United States Patent [19]

Jenkins et al.

[11] Patent Number: 5,104,965
[45] Date of Patent: Apr. 14, 1992

[54] PROCESS FOR THE PREPARATION OF CRYSTALLINE POLY(ETHYLENE TEREPHTHALATE)

[75] Inventors: Waylon L. Jenkins, Kingsport; Gerry F. Rhodes, Gray; Mark Rule, Kingsport, all of Tenn.

[73] Assignee: Eastman Kodak Company, Rochester, N.Y.

[21] Appl. No.: 658,812

[22] Filed: Feb. 22, 1991

[51] Int. Cl.$^5$ .............................................. C08G 63/78
[52] U.S. Cl. .................................... 528/272; 528/282; 528/283; 528/307; 528/308.6; 524/441; 524/442; 524/450
[58] Field of Search ............... 528/272, 282, 283, 307, 528/308.6; 524/441, 442, 450

[56] References Cited

U.S. PATENT DOCUMENTS

| | | | |
|---|---|---|---|
| 3,876,608 | 4/1975 | Anderson et al. | 523/214 |
| 4,282,137 | 8/1981 | Kohler et al. | 524/450 |
| 4,391,971 | 7/1983 | Massey et al. | 528/481 |

*Primary Examiner*—John Kight, III
*Assistant Examiner*—S. A. Acquah
*Attorney, Agent, or Firm*—Charles R. Martin; William P. Heath, Jr.

[57] ABSTRACT

A process for preparing a crystalline poly(ethylene terephthalate) having an inherent viscosity of at least 0.5 comprising (A) preparing an admixture of molten poly(ethylene terephthalate) and a zeolite, and (B) cooling the admixture at a rate less than about 300 degrees C. per minute to a temperature less than about 80 degrees C.

6 Claims, No Drawings

PROCESS FOR THE PREPARATION OF CRYSTALLINE POLY(ETHYLENE TEREPHTHALATE)

This invention pertains to a process for preparing a crystalline poly(ethylene terephthalate).

Poly(ethylene terephthalate), or PET, is a well known polymer with numerous large volume commercial applications, including fibers and packaging. However, one area in which use of PET is relatively small is in the area of molding plastics where crystalline, dimensionally stable parts are required. Although PET is substantially less expensive than competing polymers in these applications, such as poly(butylene terephthalate), it is disadvantaged because of its slow crystallization rate. This deficiency has been addressed in the past by the addition of crystallization aids and the use of hot molds (>100° C.). Crystallization aids which have been utilized in the past include low molecular weight polyolefins and sodium salts, such as sodium carbonate. A disadvantage of the use of sodium salts is that they have to be incorporated in the polymer at the reactor in order to achieve good incorporation and avoid loss of polymer molecular weight. Because PET polymerization reactors are designed for large volume continuous production, this is a expensive way to incorporate polymer additives. A disadvantage of the polyolefins is that, although the can be post reactor incorporated, they are relatively inefficient crystallization aids. Therefore, it would be an advance in the state of the art to discover an efficient crystallization aid for poly(ethylene terephthalate) which could be incorporated in a subsequent compounding step without loss of molecular weight.

It is therefore an object of the process of this invention to produce crystalline poly(ethylene terephthalate) in which a crystallization aid is incorporated into the molten PET and the resulting admixture is cooled at less than a specified rate.

It is a further object to produce a poly(ethylene terephthalate) in which the crystallization aid can be incorporated in the PET in a post reactor compounding operation.

It is yet a further object of the invention to disclose a crystallization aid which allows crystalline PET objects to be produced in a cold (<100° C.) mold.

In summary, this invention can be described as a process for preparing a crystalline poly(ethylene terephthalate) having an inherent viscosity of at least 0.5 comprising (A) preparing an admixture of molten poly(ethylene terephthalate) and a zeolite, and (B) cooling the admixture at a rate less than about 300° C. per minute to a temperature less than about 80° C.

The process of this invention is thought to be an advancement over the prior art.

U.S. Pat. No. 3,876,608 discloses the addition of 13X or 4A zeolite in polyester as a inert filler to increase surface roughness of polyester films. In this disclosure, the molten polymer film is contacted with a cooling quench drum to obtain amorphous polymer prior to biaxial orientation. Contact with such a quench drum results in extremely high rates of cooling which are greater than 500° C. per minute.

U.S. Pat. No. 4,282,137 discloses the use of zeolites to deliver inert gas into a polyester matrix to improve dyability of polyester fibers. In this disclosure, the spun molten polyester is contacted with cool air, which results in extremely high rates of cooling and results in an amorphous polymer.

U.S. Pat. No. 4,391,971 discloses passing molten polyester through a bed of zeolite pellets in order to remove acetaldehyde. In this disclosure, the zeolite is not admixed with the polyester.

With regard to this invention, the term poly(ethylene terephthalate), or PET, means a polyester in which greater than 85% of the diacid component is derived from terephthalic acid, and greater than 85 percent of the diol component is derived from ethylene glycol. Other diacid components which may be present in low levels include isophthalic acid, adipic acid, 2,6-naphthalene dicarboxylic acid, 1,4-cyclohexanedicarboxylic acid, and the like. Other diol components which may be present in low levels include diethylene glycol, neopentyl glycol, butanediol, cyclohexanedimethanol, and the like. In a preferred embodiment, the diacid component is 100% terephthalic acid and the diol component is 100% ethylene glycol.

The PET of the present invention may be prepared by any suitable polymerization method well known in the art, and selection of the specific forms of the starting materials is not critical. For example, the starting diacid may be in the form of the diacid or the diester, and the diols may be as the free diols or may be as diol esters.

In the present invention we have discovered that incorporation of certain zeolites into PET results in a polymer which has greatly increased rates of crystallization. Moreover, we have discovered that these increased rates of crystallization are less affected by increased polymer molecular weight than that what is normally observed for PET, which means high molecular weight PET can be produced with relatively little decrease in the rate of crystallization. Furthermore, these zeolites are effective whether incorporated in the polymer synthesis or by melt blending with the final polymer, and thus afford a greater degree of flexibility in producing the nucleated polymer. With certain of these zeolites, the rate of crystallization is rapid enough to allow production of crystallized parts on injection molding into cold molds where the molten polymer is subject to rapid cooling.

In general, zeolites are highly polar, crystalline aluminosilicate materials. Because of their polar, crystalline nature, they possess a regular surface with a high surface energy. Although not bound by any particular theory, We believe that certain zeolites are effective as crystallization aids for PET because of their ability to strongly attract polymer chain units and hold them in a conformation comparable with the chain conformation of the crystalline polymer, and thus provide a site for polymer crystallization. Zeolites which have been found effective for crystallization of PET within the scope of this invention includes 3A, 4A, 5A, NaY, 13X, and mordenite. Of these, NaY, mordenite, and 4A are preferred, with 4A the most preferred zeolite. These zeolite names are common names which are generally recognized by those skilled in the art as representing specific materials with well defined chemical and structural compositions.

Although polymer crystallization rates can be measured by any number of techniques, a convenient method is to measure the temperature of crystallization on heating (Tch) of amorphous PET and the temperature of crystallization on cooling (Tcc) by differential scanning calorimetry (DSC). The greater the difference between Tcc and Tch of different polymer samples under constant DSC conditions, the greater the rate of crystallization and the larger the crystallization window. In this specification, the effects of different crystallization aids are measured by this method. The maximum rate of cooling which will produce crystalline PET can be calculated by the formula Maximum rate of cooling = (Tcc Tch)/(0.3 minutes)

By this formula, the maximum rate of cooling which will produce crystalline PET when the Tcc Tch is 50° C. is 167° C. per minute.

In addition, measurement of the heat released on crystallization and comparison with the heat adsorbed on melting provides a measure of the amount of crystallization that was already present in the sample.

In this invention the inherent viscosity of the PET is at least 0.5, or, more preferably, is at least 0.6. Inherent viscosity is measured at 25° C. in a 60/40 by weight mixture of phenol/tetrachloroethane at a concentration of 0.5 g/100 mL.

In accordance with this invention the amount of zeolite in the admixture is greater than 0.1 weight percent. In a preferred embodiment the amount of zeolite is in the range of 0.1 to 25 weight percent and correspondingly the amount of PET is in the range of 99.9 to 75 weight percent, based on the weight of the admixture. In general, increasing rates of crystallization are observed to levels of about 5 weight percent zeolite, with only small increases in the rates above a level of 5%. Since the rate of crystallization does not appear to be strongly dependent on molecular weight with these zeolites, one can rapidly crystallize even high molecular weight PET.

The zeolites can be readily incorporated into PET by any suitable melt blending process, such as batch mixing, single screw, or twin screw extrusion. In addition the zeolite can be incorporated into PET by addition at or before the polymerization reaction, if so desired. Although these zeolites may be added in any form, it is preferable to add them as fine powders with a particle size of in the range of 0.1 to 50 microns, preferably 0.1 to 5 microns. Because zeolites can absorb and release large amounts of water and hence contribute to polymer hydrolysis on melt blending, it is preferable to dehydrate the zeolites by heating to >350° C. before adding them to the PET melt.

In accordance with this invention, the admixture of PET and zeolite is cooled at a rate less than about 300° C. per minute to a temperature less than 80° C. Although the admixture can be cooled in accordance with technology well known in the art, such as contact with cool air, cool liquids and cool solids, in a preferred embodiment the admixture is cooled by contact with a cool solid surface.

In the following examples the practice of the present invention is further described. Because of differences in processing conditions between examples, the appropriate controls for each experiment are given within each example. It is understood that these examples do not limit the scope of this invention.

EXAMPLE 1

In a Haake Buchler mixing center poly(ethylene terephthalate) with an inherent viscosity of 0.72 dl/g was mixed with 2.5 weight percent of various dehydrated zeolite powders for five minutes at 270° C. The obtained polymers were analyzed for crystallization rate by DSC with a 20° C./minute heating or cooling rate. The greater the value Tcc-Tch the greater the rate of crystallization. The results are tabulated below:

TABLE 1

| zeolite | Tcc-Tch (deg C.) |
| --- | --- |
| control | 31 |
| 3A | 61 |
| 4A | 70 |
| 5A | 54 |
| 13X | 37 |
| Na—Y' | 55 |
| Mordenite | 52 |

EXAMPLE 2

In a Haake-Buchler mixing center poly(ethylene terephthalate) with an inherent viscosity of 0.62 dl/g was melt blended with 1, 2.5, 5, 7.5, and 10 weight percent of 3A, 4A, 5A, NaY or 13x zeolite. The obtained polymers were analyzed for crystallization rate by DSC with a 20° C./minute heating or cooling rate. The results are tabulated below:

| weight % | Tcc-Tch (deg C.) | | | | |
| --- | --- | --- | --- | --- | --- |
|  | 3A | 4A | 5A | NaY | 13X |
| 0 | 31 | 31 | 31 | 31 | 31 |
| 2.5 | 61 | 70 | 54 | 50 | 54 |
| 5.0 | 71 | 76 | 50 | 59 | 53 |
| 7.5 | 78 | — | 51 | 54 | 57 |
| 10 | 79 | 80 | 51 | 53 | 51 |

EXAMPLE 3

To study the effect of polymer inherent viscosity on the crystallization behavior, 0.62 inherent viscosity poly(ethylene terephthalate) was melt blended with 0, 2.5, and 5 weight percent 4A zeolite in a single screw extruder. The resultant polymer was solid state polymerized at 230° C. with samples removed at 2-4 hours intervals. Measuring Tcc-Tch by DSC at 20° C./minute heating or cooling rates for these polymer samples yielded the following data:

| Inherent Viscosity | 0% | 2.5% | 5% |
| --- | --- | --- | --- |
| 0.7 | 50 | 73 | 76 deg C. |
| 0.8 | 44 | 72 | 77 deg C. |
| 0.9 | 39 | 69 | 75 deg C. |
| 1.0 | 32 | 65 | 75 deg C. |

EXAMPLE 4

Poly(ethylene terephthalate) of 0.62 inherent viscosity was mixed with 10 weight percent 4A zeolite, 5 weight percent Surlyn ionomer, or 0.03 percent sodium carbonate (sufficient to give 125 ppm sodium in PET) and was extruded at 270° C. in a twin screw extruder. DSC analysis of the resultant polymers for Tcc Tch yielded the following data:

| Additive | Tcc-Tch (deg C.) |
| --- | --- |
| none | 46 |
| Surlyn | 78 |
| $Na_2CO_3$ | 43 |
| 4A | 95 |

EXAMPLE 5

Poly(ethylene terephthalate) was prepared by polymerization of dimethyl terephthalate and ethylene glycol with a titanium/antimony catalyst and either 0 or 3.2 weight percent 13X zeolite. The polymer with 0% zeolite had a measured Tcc Tch of 36° C. The polymer prepared with 3.2 weight percent zeolite had a Tcc-Tch of 95° C.

We claim:

1. A process for preparing a crystalline poly(ethylene terephthalate) having an inherent viscosity of at least 0.5 comprising
   (A) preparing an admixture of molten poly(ethylene terephthalate) and a zeolite, and
   (B) cooling the admixture at a rate less than about 300 degrees C per minute to a temperature less than about 80 degrees C.

2. The process of claim 1 wherein the amount of zeolite is greater than 0.1 weight percent.

3. The process of claim 1 wherein the zeolite has a particle size in the range of 0.1 to 50 microns.

4. The process of claim 1 wherein the zeolite is selected from the group consisting of 3A, 4A, 5A, NaY, 13X, and mordenite.

5. The process of claim 4 wherein the zeolite is selected from the group consisting of NaY, mordenite and 4A.

6. A process for preparing a crystalline poly(ethylene terephthalate) having an inherent viscosity of at least 0.6 comprising
   (A) preparing an admixture of 75 to 99.9 weight percent molten poly(ethylene terephthalate) and 25 to 0.1 weight percent of a 4A zeolite powder having a particle size in the range of 0.1 to 5 microns, and
   (B) cooling the admixture at a rate of less than 300 degrees C per minute to a temperature less than 80 degrees C.

* * * * *